United States Patent Office 3,347,661
Patented Oct. 17, 1967

3,347,661
CYCLIC LEACHING PROCESS EMPLOYING IRON OXIDIZING BACTERIA
Albert A. Mayling, Kingston, Ontario, Canada, assignor, by mesne assignments, to Bio Metals Corporation Ltd. (N.P.L.), Vancouver, British Columbia, Canada, a body corporate of British Columbia
No Drawing. Filed Feb. 15, 1965, Ser. No. 432,860
Claims priority, application Canada, July 29, 1964, 908,279
18 Claims. (Cl. 75—104)

This invention relates to a cyclic leaching process. More particularly it is directed to the leaching of sulphide minerals by means of a novel lixiviant.

Leaching of ores using aqueous solutions have generally been regarded as being too slow to be economical where other recovery processes can be employed. The leaching action of a ferric chloride solution in dissolving gold and other materials is well known. In addition, it is known that ferric chloride in acid solution is a more efficient solvent for various copper sulphide minerals than an acid ferric sulphate solution.

In dissolving the metals and minerals the ferric chloride is reduced to ferrous chloride which itself has no appreciable action. Up to the present time regeneration of the ferric solution has presented practical difficulties which presented a bar to further progress. Oxidation of an acid ferrous chloride solution with air is very slow and possible autooxidation with $SO_2$ and air represents a cumbersome plant handling large volumes of very corrosive liquors.

A procedure has been developed and is published as Canadian Patent No. 684,552 of Apr. 14, 1964, wherein ferrous iron values are oxidized in an acidic aqueous medium containing the ferrous iron values and at least one of vanadium or uranium values, and an effective quantity of live, non-spore forming, rod-shaped, motile autotropic, oxidizing bacteria, to oxidize the ferrous iron values. While the disclosure refers to the use of a wide variety of acidic aqueous media being useful, the only examples shown are with the use of sulphate ions. This is to be expected since it was well known, i.e., from the textbook, "Bacteriology," 5th edition, Buchanan, published by MacMillan 1951, which states:

"Chlorides are not generally efficient in low concentration but when present in excess, they exert a decided preservative action. Few organisms can develop in a brine containing 20% NaCl. Advantage is taken of this fact in the use of salt and brine in pickling and preserving foods."

A prime feature of the present invention is the provision of a practical leaching procedure utilizing a ferric chloride lixiviant solution.

Another feature of this invention is the provision of a novel process for leaching copper from copper-bearing sulphide ores.

Another feature of this invention is the provision of a novel process for leaching gold from gold-bearing ores.

Another feature of this invention is the provision of a novel process for leaching silver from silver-bearing ores.

Yet another feature of this invention is the provision of a novel process leaching lead-bearing ores.

A still further feature of this invention is the provision of a novel process for upgrading high iron content chromite ore.

Still another feature of this invention is the provision of a process of upgrading high iron content titanic ore.

A further feature of this invention is the provision of a process for extracting zinc from zinc-bearing sulphide materials.

A further feature of this invention is the provision of a process for extracting zinc from zinc-bearing sulphide materials.

Another feature of this invention is the provision of a process for extracting uranium from uranium ores.

Another feature of this invention is the provision of a process for extracting molybdenum from molybdenum ores.

Yet another feature of the invention is the provision of a process for removing, by extraction, sulphur from coal.

Surprisingly it has been discovered, and by a broad aspect of the present invention there is now provided a cyclic leaching process comprising: leaching an ore with a lixiviant solution comprising an acid ferric chloride solution essentially free of ferric sulphate and containing an effective quantity of motile, non-spore forming oxidizing autotrophic, rod bacteria, which are tolerant to the constituents and to said lixiviants, whereby, during said leaching, said ferric chloride is reduced to ferrous chloride; and regenerating said lixiviant by oxidizing said solution by aeration in the presence of said bacteria.

Preferably, the lixiviant solution is initially innoculated with cultures of the said oxidizing autotrophic bacteria whose tolerance for the constituents of the lixiviant has been achieved by artificial breeding on culture media containing progressively greater concentrations of the ions concerned.

Preferred embodiments of this invention include: where the ore comprises copper-bearing sulphide ores and where the metallic copper is recovered by cementation on metallic iron;

Where the ore material comprises gold or other precious metal, i.e., platinum, rhodium, etc., bearing ores and wherein the gold or other precious metal, i.e., platinum, rhodium, etc., is recovered as metal by reducing the ferric chloride with iron, $SO_2$ or some other suitable reductant;

Where the ore comprises silver bearing ores and where the silver is recovered as metal by cementation on metallic iron, and preferably by operating this leaching operation in two stages, the first stage where the silver is converted to insoluble silver chloride with a dilute ferric chloride solution, and the second stage being a leach with a strong brine solution to dissolve the silver chloride and from which latter solution the silver is recovered;

Where the metallurgicial material comprises lead bearing ores, and preferably operating this leaching operation in two stages similar to those preferred with reference to the silver, the lead here being first converted to insoluble lead sulphate.

The process of the invention involves the use and the continued regeneration of an acid ferric chloride lixiviant which has been innoculated with iron-, sulphide-, and sulphur-oxidizing autotrophic bacteria tolerant to relatively high concentrations of the metal or metals to be extracted and to the chemical constitution of the lixiviant solution.

It is now known that there is a whole series of autotrophic bacteria which derive their energy from the oxidation of purely inorganic media and that requires no organic feed stock in their life cycle. The carbon required for body building is obtained only from carbon dioxide and the nitrogen, phosphorus and other elements in their body structure from purely inorganic materials. These microscopic forms of life are generally known as a genus of Thiobaccilli. Under this head can be found *thiooxidans, concretivorus, neopolitanus, thioparus,* and *ferrooxidans.* Some of these bacteria will oxidize all reduced forms of sulphur to the sulphate and some will oxidize ferrous iron to ferric. In addition, it is noted that genus of *Ferrobacillus ferrooxidans* derives its energy from the oxidation of ferrous iron only. The literature reports that some of these bacteria can tolerate acidities as high as 10% $H_2SO_4$ concentration and metal salt concentration as high as 20% $MgSO_4$.

The strain of bacteria useful in the process of the present invention are non-spore forming, rod-shaped, motile, autotrophic oxidizing bacteria which have the ability to oxidize ferrous ion to ferric ion. Usually, the bacteria are approximately 0.5 to 1.0 millimicron in width and 1 to 2 millimicrons in length, and derive their energy from the oxidation of ferrous iron and perhaps to some extent by the oxidation of other substances such as sulphur which may be present. They are capable of using carbon dioxide as a source of carbon, and organic materials are not essential for their growth. They require an acidic aqueous medium for growth.

In their naturally occurring state, the bacteria from which the strain of the invention is developed seem to be substantially identical with *Ferrobacillus ferrooxidans*, *Thiobacillus ferrooxidans*.

The American Type Culture Collection, 2112 M St., NW., Washington 7, D.C., has given collection catalog number 13,661 to a strain of *Ferribacillus ferrooxidans* and a number 13,598 to a strain of *Thiobaccillus ferrooxidans* which may be used in developing a strain of bacteria for practicing the present invention. However, all of these types of bacteria must be artificially bred or grown to obtain a strain which exhibits a satisfactory tolerance to the chemical constituents of the lixiviant solution.

In the present invention these bacteria have been bred to tolerate relatively high concentrations of various metals such as iron, zinc, copper and chemicals such as sodium chloride. This tolerance can be bred into many of these bacterial by gradually increasing the concentration of the chemical in the solution.

In normal operation, the bacteria on transfer to a different feed material exhibit a lag period wherein nothing appears to occur. According to the inbred tolerance of the bacterial strain this period can be of short duration and it has also been found to be as long as 13 weeks in the instance of *Thiobacillus concretivorus* 1370 acclimated to a sulphur feed stock and then introduced to a marcasite feed stock in coal. Two to four weeks is more normal and this figure was found to be the case in the instance of the same bacteria feeding on a copper sulphide ore and then being introduced to a sulphur feed. Where the bacteria is introduced to a fresh environment of the same feed material there is no lag period.

Following this lag period there is an exponential growth period when the population in a solution multiplies to the extent that it is usually visible to the naked eye as a cloudy solution. These bacteria are so small that, individually, they are only just visible under a high-powered oil-immersion microscope.

The next phase is a steady state when as many bacteria are formed as the number that die, followed by the death period when they are poisoned by the products of their own activity. The bacterial colony should be kept in the steady state at a point not far from the exponential growth period.

It is also possible to grow a strain of bacteria which is tolerant to the conditions under which the bacteria are to be used such as the temperature and pH of the solution to be oxidized. The bacteria may be bred to tolerate desired conditions of temperature and pH in a manner analogous to developing tolerance to the other lixiviant ingredients. Care is taken to first use temperature and pH conditions which the growing bacteria will tolerate, and then the conditions are changed gradually over a long period of time toward those under which it is desired to operate.

The aqueous medium containing the iron values to be oxidized should be maintained at a temperature above the freezing point and not greater than about 50° C. Thus, the operating temperature should range between about 0° C. and about 50° C. The preferred temperature range for practical operation is usually between about 15° C. and 40° C., with best results usually being obtained at about 35° C.

The aqueous medium containing the iron to be oxidized must be acidic. However, wide pH levels are possible when the bacteria are properly artificially bred to establish a desired degree of tolerance. The bacteria are very active at pH levels as low as about 0.8–.9 and as high as about 3. In most instances, a pH range between about 1.1–1.2 and 2.6–2.8 is preferred. Within this range, it is usually possible to have the oxidation proceed at a pH of about $1.5 \pm 0.2$ and maintain oxidized metal values in solution when this is desired. However, in instances where it is desirable to have oxidized metal values precipitate from solution as the oxidation proceeds, then a pH of about $2.5 \pm 0.3$ usually is preferred.

The oxidation rate may be improved markedly by aerating the solution with air, or any satisfactory elemental oxygen-containing gas. In instances where carbon dioxide is not present in the solution in sufficient amount, then the elemental oxygen-containing gas should also contain carbon dioxide as the bacteria normally depend upon it for a source of carbon. Usually, it is preferred that the aeration be vigorous, and often sufficiently vigorous to agitate the solution. Alternatively, the lixiviant may be used in situ by merely trickling over oxposed ore without any positive bubbling.

In the natural oxidation of sulphide minerals, the bacteria oxidize the sulphide radical to sulphate and ferrous iron to ferric giving an acid ferric sulphate liquor which can act as a lixiviant. Bacterial leaching of a copper sulphide mineral may take place where no iron salt could be detected in the solution and no apparent precipitation of iron by hydrolysis on the ore. In many bacterial leaching operations the acid ferric sulphate can also act as a lixiviant and the bacterial will tolerate quite high concentrations of the ferric and sulphate ions. However, in the present invention, for operations, one example of which is the leaching of lead sulphide with acid ferric chloride, the presence of a high concentration of sulphate ion should be avoided as a high concentration of sulphate ion will depress the solubility of the resulting lead sulphate in chloride solutions. Ferric chloride is a solvent for gold whereas ferric sulphate shows only a limited attack on this metal. Ferric chloride is also a more effective lixiviant than ferric sulphate for many copper sulphide minerals. Therefore, in accordance with the present invention involving the use of a ferric chloride leach with bacterial regeneration of the ferric ion, steps have been taken to remove essentially all of the sulphate ion.

Although a strong brine solution is recognized as an effective bactericide, the sulphur and iron oxidizing bacteria will tolerate appreciable concentrations of sodium chloride in solution. Not only do they tolerate the presence of this chemical, but at the lower levels of sodium chloride concentration, the bacteria respond by exhibiting a faster growth rate. This would indicate that these bacteria, in common with most forms of life, do require some salt in their diet. These facts are shown in the summary of the following experiments in which a suspension of sulphur in common salt solutions of various strengths was aerated in Pachucas with the addition of *Thiobacillus thiooxidans*.

TABLE I

| | Times of Aeration (days) | | | |
|---|---|---|---|---|
| | 10 | 17 | 24 | 31 |
| | $H_2SO_4$, g./l. | | | |
| Percent NaCl in Solution: | | | | |
| 20 | 0 | 0 | 0 | 0 |
| 10 | 0.04 | 0.02 | 0 | 0 |
| 5 | 0.16 | 0.32 | 4.25 | 6.4 |
| 1 | 9.9 | 11.4 | 16.6 | 21.9 |
| 0 | 4.5 | 7.1 | 16.2 | 21.6 |

These experiments showed an optimum NaCl concentration between 0 and 5 percent. This was further investigated in the following experiments.

TABLE II

| Percent NaCl in Solution: | Time of Aeration (days) | | |
|---|---|---|---|
| | 10 | 17 | 21 |
| | H₂SO₄, g./l. | | |
| 0 | 0.4 | 6.2 | 10.1 |
| 0.1 | 2.9 | 9.6 | 14.2 |
| 0.5 | 2.8 | 7.6 | 10.6 |
| 1.0 | 1.0 | 7.9 | 12.0 |
| 2.0 | 2.0 | 5.7 | 9.4 |
| 3.0 | 0.9 | 3.9 | 9.1 |

The Pachucas containing 10 percent and 20 percent NaCl were left aerating with the addition of 1/200 of their volume from the 5 percent Pachuca containing viable bacteria. The following figures were obtained:

TABLE III

| Concentration of NaCl, percent | 10 | 20 |
|---|---|---|
| | H₂SO₄, (g./l.) | |
| Time of aeration (days): | | |
| 0 | 0 | 0 |
| 7 | 0.2 | 0 |
| 14 | 0.3 | 0 |
| 21 | 0.5 | 0 |
| 28 | 0.8 | 0 |

These figures show that the bacteria can be bred to show some degree of tolerance for a 10 percent NaCl solution and give hope that breeding would show a greater degree of tolerance if it were found necessary to operate at these higher concentrations of NaCl.

*Thiobacillus concretivorous* also shows the same tolerance for NaCl solutions, as shown by the following table:

TABLE IV

| Percent NaCl: | Time of Aeration (days) | | | | |
|---|---|---|---|---|---|
| | 0 | 7 | 14 | 21 | 28 |
| | H₂SO₄ g./l. | | | | |
| 0 | 0 | 4.4 | 8.1 | 9.3 | 10 |
| 0.1 | 0 | 5.8 | 9.0 | 10.2 | 11.0 |
| 0.2 | 0 | 5.8 | 10.0 | 11.2 | 11.8 |
| 0.5 | 0 | 5.3 | 10.8 | 13.0 | 14.8 |
| 1.0 | 0 | 4.1 | 9.1 | 10.6 | 10.8 |

The tolerance of *Thiobacillus thiooxidans* and *concretivorus* for ferric chloride solutions is similar to that shown for NaCl but at lower levels of concentration, as shown by the following figures:

TABLE V.—*CONCRETIVORUS*, FeCl₃ IN 0.5% NaCl

| Percent FeCl₃: | Time of Aeration (days) | | | | |
|---|---|---|---|---|---|
| | 0 | 7 | 14 | 21 | 28 |
| | H₂SO₄ g./l. | | | | |
| 0 | 0 | 0 | 1.6 | 2.7 | 2.9 |
| 0.1 | 0 | 0 | 1.1 | 2.1 | 2.3 |
| 0.2 | 0 | 0 | 0.1 | 0.9 | 1.9 |
| 0.5 | 0 | 0 | 0 | 0.2 | 0.2 |
| 1.0 | 0 | 0 | 0 | 0.1 | 0.2 |

TABLE VI.—*THIOOXIDANS*, FeCl₃ IN 0.5% NaCl

| Percent FeCl₃: | Time of Aeration (days) | | | | | |
|---|---|---|---|---|---|---|
| | 0 | 7 | 14 | 21 | 28 | 35 |
| | H₂SO₄ g./l. | | | | | |
| 0 | 0 | 0.9 | 5.4 | 8.3 | 10.5 | 10.6 |
| 0.1 | 0 | 0.1 | 4.7 | 10.0 | 11.3 | 11.9 |
| 0.2 | 0 | 0.1 | 0.2 | 0.2 | 1.1 | 1.9 |
| 0.5 | 0 | 0 | 0.2 | 0.2 | 0.5 | 0.4 |
| 1.0 | 0 | 0 | 0 | 0 | 0.1 | 0.4 |

*Ferrobacillus ferrooxidans* also exhibits a similar degree of tolerance for chloride solutions as shown by the following figures:

TABLE VII

| Percent NaCl in Solution: | Time of Aeration (days) | | | | | |
|---|---|---|---|---|---|---|
| | 0 | | 3 | | 6 | |
| | Fe₂, g./l. | Fe₃, g./l. | Fe₂, g./l. | Fe₃, g./l. | Fe₂, g./l. | Fe₃, g./l. |
| 0 | 5.2 | 0 | 1.8 | 3.4 | 0 | 5.2 |
| 0.1 | 5.2 | 0 | 2.2 | 3.0 | 0 | 5.2 |
| 0.2 | 5.2 | 0 | 2.5 | 2.7 | 0.1 | 5.1 |
| 0.5 | 5.2 | 0 | 2.2 | 3.0 | 0.3 | 4.9 |
| 1.0 | 5.2 | 0 | ¹4.2 | ¹1.0 | 0.9 | 4.3 |

¹ The low figures may have been due to poor aeration.

It is apparent that these bacteria will tolerate a common salt concentration of up to 5% NaCl and may even be bred to tolerate higher concentration.

These experiments show that concentrations up to 1% have no effect on the bacteria and that the bacteria will still operate, although less efficiently, at 5% concentration. There are also indications that they can be bred to accept higher concentrations of NaCl. The bacteria show a lesser tolerance for ferric chloride being 1–2 g. FeCl₃/l. for *concretivorus* and *thiooxidans* and 5 g./l. for *ferrooxidans*. It is probable that they can be bred to a higher tolerance for ferric chloride; however, the figures obtained for their natural tolerances, i.e., less than 5 g./l., and preferably, 1–2 g./l., are adequate for practical leaching operations.

There are a number of bacteria which oxidize sulphur and sulphides to the sulphate form and *Ferrobacillus ferrooxidans* oxidizes ferrous iron to ferric. Some of the sulphur oxidizing bacteria also oxidize ferrous iron to ferric. Various strains of bacteria exhibit degrees of tolerance for chloride, ferric, iron, gold, silver, lead, copper and the many other metals that dissolve in acid ferric chloride solution and to the other trace impurities that are leached from the ores and metallurgical products. Many of these bacteria can be bred to tolerate appreciably high concentrations of materials that would normally act as poisons at these higher concentrations. In operating this leaching procedure according to the present invention, the strain or strains of bacteria which are most suitable for the designed operations are selected; alternatively, are bred which are suitable by gradually increasing the tolerance of strains that were not initially acceptable. It is also understood that in oxidizing a sulphide or sulphur, the solution produced contains sulphate. Thus, it is necessary to include a precipitation operation for the sulphate to prevent build up of sulphate. Excess sulphate in solution will tend to form ferric sulphate in the leach solution which is not an efficient leaching agent for gold and the sulphate iron is a precipitant for lead. Effective reducing of sulphate ion concentration can be accomplished by the addition of CaCl₂ solution at an appropriate point in the operating cycle.

The following examples are given to illustrate the present invention:

In leaching gold bearing ores and residues it will be necessary to ensure that the leach solution is maintained in the ferric state since ferrous iron is a precipitant for gold. This fact forms the basis of a convenient procedure for recovering the gold since it is only necessary to reduce the iron to the ferrous state to recover the gold. This may be accomplished with scrap iron or some other suitable reductant. In this procedure all the gold should be precipitated before bacterial oxidation of the ferrous chloride to ferric chloride occurs.

EXAMPLE 1

LEACHING OF GOLD BY FERRIC CHLORIDE 1000 g. of gold bearing ore waste containing 0.1 oz. gold/ton (approx. 3 p.p.m.) and 0.5% $FeS_2$ was crushed to pass through a 1″ mesh sieve and placed in a leach vessel fitted with an air lift recycle. 200 ml. of liquor containing approximately 2 g. Fe/l. as $FeCl_3$ and 5 g. NaCl/l. was placed in the equipment and the solution left recycling. The equipment was drained at weekly intervals and analyzed for ferric and ferric contents and for gold, the latter by a semi-quantitative determination using the colour developed with gold solutions by stannous chloride. During the first 10 weeks it was found that most of the ferric iron had been reduced to ferrous iron and there was no gold in solution. This ferrous liquor was regenerated to the ferric condition by aeration with the addition of a few drops of *Thiobacillus ferrooxidans* culture—simulating the return to a regenerative sump in practical operations. A fresh quantity of ferric chloride/ sodium chloride liquor was added for the second operating week. Every succeeding week thereafter the regenerated liquor from the previous week was used. After 10 weeks gold as detected in the solution and was removed by passage over a bed of charcoal. No attempt was made to recover the gold since the experiment showed clearly that this cyclic chloride leach with bacterial regeneration was an adequate process for solution of gold from this ore. Recovery of gold from such solutions is an established practice. It was noted that no gold appeared in the solution until there was approximately 10 times the amount of ferric iron in solution as ferrous. It was thought that the initial reduction of ferric iron to ferrous was due to the oxidation of the pyrites in the ore.

In leaching silver ores and residues and with lead the process should be operated in two stages, one stage consisting of the use of a dilute solution of ferric chloride with bacterial regeneration being used as an oxidant, the silver and lead being mainly insoluble in the dilute solution and the other stage being a leaching with a strong brine or other salt solution to dissolve the silver chloride and lead sulphate. This preferred operation is predicted on the data shown by the table of the solubilities of the silver chloride and lead sulphate in various metal chloride solutions.

*Solubility of AgCl in chlorides*

|  | Percent of Salt in Solution | Percent Ag in Solution |
|---|---|---|
| Formula of salt: |  |  |
| KCl | 25 | 0.069 |
| NaCl | 26 | 0.096 |
| $NH_4Cl$ | 28 | 0.276 |
| $CaCl_2$ | 41 | 0.628 |
| $MgCl_2$ | 36 | 0.54 |
| $BaCl_2$ | 27 | 0.056 |
| $FeCl_2$ | 31 | 0.180 |
| $FeCl_3$ | 37 | 0.0004 |
| $MnCl_2$ | 44 | 0.222 |
| $ZnCl_2$ | 53 | 0.063 |
| $CuCl_2$ | 44 | 0.063 |

Silver chloride is appreciably soluble in saturated metal chloride solutions whereas it is almost insoluble in dilute solutions as shown by its solubility in NaCl.

| NaCl, g./l.: | Ag, g./l. |
|---|---|
| 0.23 | 0.000077 |
| 0.53 | 0.0001 |
| 1.1 | 0.00014 |
| 2.1 | 0.00021 |
| 5.2 | 0.0004 |
| 20.6 | 0.0019 |
| 30 | 0.0031 |
| 57 | 0.009 |

Lead sulphate behaves similarly, its solubility in dilute NaCl solutions being as follows:

*Solubility of $PbSO_4$ in NaCl*

| NaCl, g./l.: | Pb, g./l. |
|---|---|
| 0 | 0.026 |
| 5.8 | 0.11 |
| 11.6 | 0.19 |
| 17.5 | 0.27 |
| 23.4 | 0.38 |

It is soluble to the extent of 9 percent in saturated NaCl at 90° C. and 1 percent at 20° C.

The following are typical examples of the leaching of silver from silver-bearing ores and the leaching of lead from lead-bearing ores:

EXAMPLES 2 AND 3

LEACHING OF LEAD AND SILVER BY FERRIC CHLORIDE 1000 g. of an ore from eastern Ontario were crushed to pass through a 1″ screen and placed in a leach vessel fitted with an air lift recycle. Ten grams of sulfur were added as it was found that the ore contained acid consumers (dolomite etc.) corresponding to an acid consumption of 60 lbs. $H_2SO_4/1$ ton ore. The ore contained 0.7% Cu, 1.5% Zn, 2.8% Pb and 1 oz. Ag/ton. Two hundred ml. of a solution containing 2 g. $FeCl_3/l.$ and 5 g. NaCl/l. were then added and left recycling with the addition of a few ml. of a bacterial culture obtained from the oxidized ore on the property. The strains of bacteria have been identified in this culture, these being *Thiobacillus thiooxidans* and *Thiobacillus ferrooxidans*—there are no doubt other strains present. After one week, the apparatus was drained and the copper dissolved precipitated by cementation with iron. The solution was then transferred to a Pachuca and left aerating of the next week serving as the feed liquor for the third week, after filtration. Fresh solution was added for the second week and thereafter the liquor from the previous week was used, with a fresh liquor make up. The product liquor usually contained 0.2–0.4 g. Cu/l. no analysis was made for zinc and no attempt was made to recover this metal in these experiments. After the experiment had been operating for six months, the equivalent was drained and 200 ml. of 20% NaCl solution left cycling for one week, the equipment again being drained. Cementation with iron showed that roughly 2 grams of Pb had been dissolved in the 20% NaCl solution. The precipitated lead was leached in $HNO_3$. Silver was detected in the resulting solution.

This experiment shows that it is possible to dissolve all the values from this ore and to recover them. No silver or lead could be detected in the copper bearing solutions although there is no doubt that these metals must have been present in traces and would be carried down with the copper in the cementation process.

In general, the acid ferric chloride solution is brought into contact in any suitable manner with the metallurgical material to be leached. In this part of the operation, the operating procedure will take into consideration the nature of the reactions being carried out of those that follow.

The bacteria require large volumes of air to oxidize the sulphides so that in a heap leach the heap is made so as to have an open structure as far as possible and the flow rate of the liquor adjusted so as to damp the ore as uniformly as possible but not to flood it. On the other hand, the ensuing stage with copper and with some other metals demands that the pregnant liquor contain as little ferric iron as possible so it would then be advisable to flood the last one or two heaps to starve the bacteria of air and obtain the maximum chemical reduction of the ferric iron by chemical oxidation of the sulphides. With ground ore it is preferable to use pachucas rather than agitators in a leaching circuit with one or two agitators at the end of the circuit to obtain minimum ferric iron in solution. In leaching gold ores it will be necessary to maintain a high ferric content throughout the leach circuit.

The pregnant liquor is separated from the undissolved solids by decantation, filtration, etc., and then passes to a metal recovery stage. The operations carried out in this stage—chemical precipitation, solvent extraction, etc.— will depend on the nature of the material to be extracted. The liquor then, generally in a ferrous state, will then pass to the bacterial regeneration stage where it will be oxidized with air by bacterial action to the ferric state and becomes the leach solution for the next leach cycle. At a suitable point in the cycle of operations a sulphate removal step will be included where $CaCl_2$ is added to remove sulphate ion.

I claim:

1. A cyclic leaching process comprising: leaching an ore with a lixiviant solution comprising an acid ferric chloride solution essentially free of ferric sulphate and containing an effect quantity of motile, non-spore forming oxidizing autotrophic rod bacteria which are tolerant to the constituents of said lixiviants, whereby, during said leaching, said ferric chloride is reduced to ferrous chloride; and regenerating said lixiviant oxidizing said solution by aeration in the presence of said bacteria.

2. The process of claim 1 wherein the concentration of ferric chloride is under 5 g./l.

3. The process of claim 1 wherein the concentration of ferric chloride is 1–2 g./l.

4. The process of claim 1, wherein the medium has a pH value between about 0.8 and 3.

5. The process of claim 1, wherein the medium has a temperature of between about 0° C. and about 50° C.

6. The process of claim 1 wherein the lixiviant solution is initially inoculated with cultures of the said oxidizing autotrophic bacteria whose tolerance for the constituents of the lixiviant has been achieved by artificial breeding on culture media containing progressively greater concentrations of the ions concerned.

7. The process of claim 1, wherein the ore comprises copper bearing sulphide ores and where the metallic copper is recovered by cementation on metallic iron.

8. The process of claim 1, wherein the ore material comprises gold bearing ores and wherein the gold is recovered as metal by reducing the ferric chloride with iron, $SO_2$ or some other suitable reductant.

9. The process of claim 1, wherein the ore comprises silver bearing ores and where the silver is recovered as metal by cementation on metallic iron.

10. The process of claim 1, wherein the ore comprises silver bearing ores and where the silver is recovered as metal by comentation on metallic iron and wherein the procedure involves operating this leaching operation in two stages, the first stage wherein the silver is converted to insoluble silver chloride with a dilute ferric chloride solution, and the second stage wherein a leach with a strong brine solution dissolves the silver chloride and from which latter solution the silver is recovered.

11. The process of claim 1, wherein the metallurgical material comprises: lead-bearing ores.

12. The process of claim 1, wherein the metallurgical material comprises lead-bearing ores and wherein the procedure involves operating this leaching operation in two stages similar to the first stage where the lead is first converted to insoluble lead sulphate with a dilute ferric sulphate solution and the second stage wherein a leach with a strong brine solution dissolves the lead sulphate and from which latter solution the lead is recovered.

13. A cyclic process for the up-grading of high iron content chromite ore, comprising: roasting the said ore under reducing conditions to reduce the iron to the metallic state, subjecting the roasted ore to the leaching action of an acid ferric chloride solution containing an effective quantity of autotrophic bacteria whereby regeneration of the said lixiviant will be expedited; conducting the spent lixiviant following each leach cycle to a regeneration stage, subjecting the spent lixiviant and to aeration in the regeneration stage to convert the regenerated leach solution to the next cycle of the leaching operation.

14. A cyclic process for the up-grading of high iron content titanic ore, comprising: roasting the said ore under reducing conditions to reduce the iron to the metallic state, subjecting the roasted ore to the leaching action of an acid ferric chloride solution containing an effective quantity of autotrophic bacteria whereby regeneration of the said lixiviant will be expedited; conducting the spent lixiviant following each leach cycle to a regeneration stage, subjecting the spent lixiviant and to aeration in the regeneration state to convert the regenerated leach solution to the next cycle of the leaching operation.

15. A cyclic process for the extraction of zinc from zinc bearing sulphide materials, comprising subjecting the said material to the leaching action of an acid ferric chloride lixiviant solution containing an effective quantity of suitable autotrophic bacteria tolerant to zinc, whereby regeneration of said solution will be expedited, recovering zinc from the pregnant lixiviant solution, passing the spent lixivant to aeration in a regenerative stage wherein the ferrous chloride is oxidized to ferric with air by the said bacteria, conducting regenerated leach solution to the next leaching cycle.

16. The process of claim 13, wherein the medium has a pH value between about 0.8 and 3.

17. The process of claim 13, wherein the medium has a temperature of between about 0° and about 50° C.

18. The process of claim 13, wherein the medium has a pH value between about 0.8 and 3, and wherein the medium has a temperature of between about 0° and about 50° C.

References Cited

UNITED STATES PATENTS

| | | | |
|---|---|---|---|
| 1,485,909 | 3/1924 | Christensen | 75—104 |
| 2,829,964 | 4/1958 | Zimmerley et al. | 75—101 |
| 3,218,252 | 11/1965 | Glover et al. | 75—104 |
| 3,305,353 | 2/1967 | Duncan et al. | 75—101 |

DAVID L. RECK, *Primary Examiner.*

HYLAND BIZOT, *Examiner.*

N. MARKVA, *Assistant Examiner.*